United States Patent [19]
Heuft

[11] Patent Number: 5,918,270
[45] Date of Patent: Jun. 29, 1999

[54] PROCESS AND DEVICE FOR TESTING DEFORMABLE CONTAINERS FOR TIGHTNESS

[75] Inventor: Bernhard Heuft, Burgbrohl, Germany

[73] Assignee: Heuft Systemtechnik GmbH, Burgbrohl, Germany

[21] Appl. No.: 08/981,675

[22] PCT Filed: Jul. 5, 1996

[86] PCT No.: PCT/EP96/02967

§ 371 Date: Jan. 6, 1998

§ 102(e) Date: Jan. 6, 1998

[87] PCT Pub. No.: WO97/03343

PCT Pub. Date: Jan. 30, 1997

[30] Foreign Application Priority Data

Jul. 7, 1995 [DE] Germany ............ 195 24 844

[51] Int. Cl.⁶ .................................................. G01M 3/04
[52] U.S. Cl. .................. 73/45.4; 73/52; 73/41.4
[58] Field of Search .................. 73/866, 52, 41, 73/41.3, 41.4, 45, 45.1, 45.2, 45.3, 45.4

[56] References Cited

U.S. PATENT DOCUMENTS

| | | | |
|---|---|---|---|
| 3,824,840 | 7/1974 | Amberg | 73/45.3 |
| 3,847,014 | 11/1974 | Mistarz | 73/45.4 X |
| 3,879,987 | 4/1975 | Yasuhiro et al. | 73/41 X |
| 3,930,401 | 1/1976 | Filler | 73/45.3 X |
| 3,998,091 | 12/1976 | Paquette et al. | 73/52 |
| 4,081,991 | 4/1978 | Powers, Jr. | 73/41 |
| 4,188,819 | 2/1980 | Egee et al. | 73/52 |
| 4,747,298 | 5/1988 | McDaniel | 73/52 X |
| 4,747,299 | 5/1988 | Fox et al. | 73/52 X |
| 4,756,184 | 7/1988 | Reishus et al. | 73/45.4 X |
| 4,788,850 | 12/1988 | Buschor et al. | 73/41 X |
| 4,862,732 | 9/1989 | Raymond | 73/45.4 |
| 4,864,848 | 9/1989 | Irvine | 73/45.4 |
| 4,930,345 | 6/1990 | Bausch | 73/45.4 |
| 5,033,287 | 7/1991 | Watanabe et al. | 73/52 |
| 5,497,654 | 3/1996 | Lehmann | 73/52 X |
| 5,507,177 | 4/1996 | Focke | 73/52 X |
| 5,571,949 | 11/1996 | MacLaughlin | 73/45.3 |
| 5,767,392 | 6/1998 | Belcher et al. | 73/41 |

FOREIGN PATENT DOCUMENTS

| | | | |
|---|---|---|---|
| 41 21 867 A1 | 1/1993 | Germany | G01M 3/36 |
| 0657294 | 4/1979 | U.S.S.R. | |
| 1227961 | 4/1986 | U.S.S.R. | |
| 1273760 | 11/1986 | U.S.S.R. | |
| 1281944 | 1/1987 | U.S.S.R. | |
| 2109942 | 6/1983 | United Kingdom | |

*Primary Examiner*—Elizabeth L. Dougherty
*Attorney, Agent, or Firm*—Gardner, Carton & Douglas

[57] ABSTRACT

For the purpose of testing deformable containers (2) for tightness, a negative pressure is generated in the container (2) and the internal pressure is then measured. The negative pressure is generated by deformation of the container (2). A sealing strip (6) is set on the container opening (8) in order to maintain the negative pressure in the container (2). In non-tight containers, the pressure increases relatively rapidly again to the ambient pressure.

8 Claims, 2 Drawing Sheets

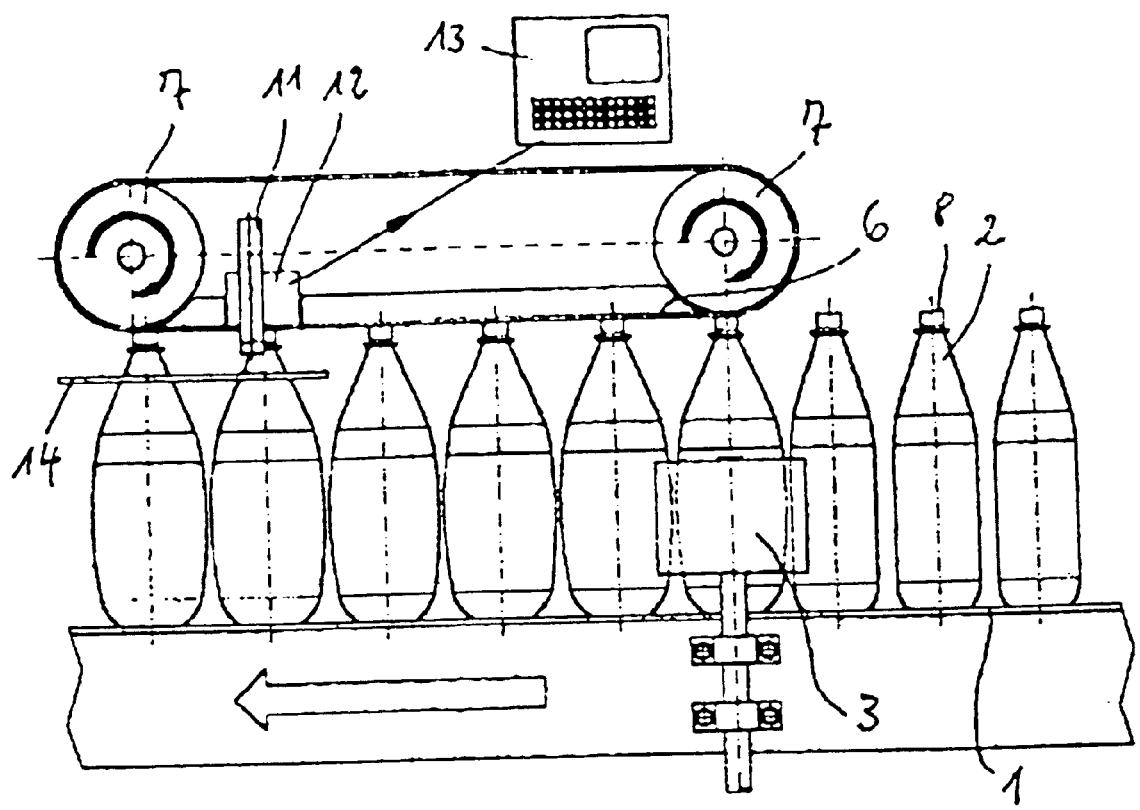
Fig. 1
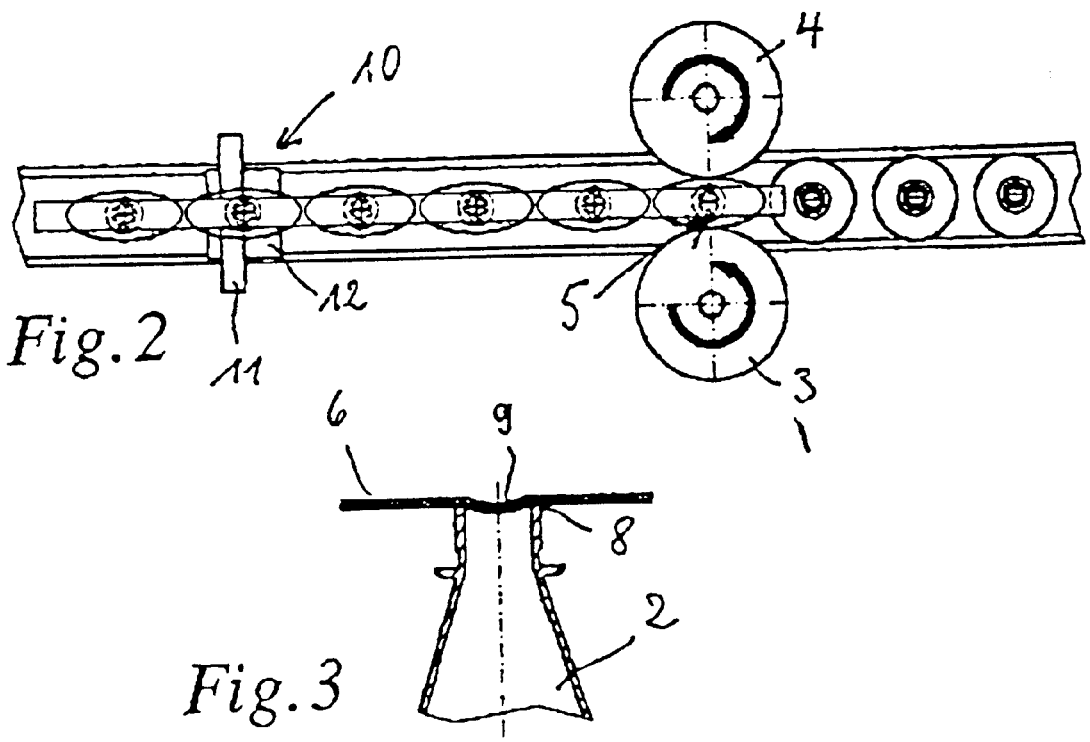
Fig. 2
Fig. 3

PROCESS AND DEVICE FOR TESTING DEFORMABLE CONTAINERS FOR TIGHTNESS

BACKGROUND OF THE INVENTION

1. Field of the Invention

The invention concerns a method and a device for testing for tightness deformable containers which regain their original form through their inherent or an external restoring force, particularly plastic containers, whereby a negative pressure is generated in the container and a change in the negative pressure is determined.

2. Scope of the Prior Art

In the case of so-called returnable plastic containers, particularly beverage bottles, and unlike returnable glass bottles, internal pressure tests are necessary prior to a refilling, due to the thinness of their walls and the risk of embrittlement of the material due to ageing. The purpose of the internal pressure test is to detect holes and embrittlement cracks in the container wall.

Hitherto, this has been very elaborately effected by means of a rotary machine with a star wheel, each bottle being transported in a star wheel compartment where it is pressurized with a defined pressure, and pressure changes being measured and evaluated after a definite period of time or a definite distance by means of a differential pressure measuring device. This measuring device must be set on the bottle opening in an extremely precise and impervious manner. This is relatively easily achievable due to the defined guidance of the bottles by means of the star wheel.

A method of the type initially referred to is known from U.S. Pat. No. 3,762,213. In this case, the negative pressure in the container is generated in that a cylinder with a displaceable piston is set on the container opening and the piston is then retracted. Due to the negative pressure, the container is then suspended from the cylinder, and the period of time for which the container is suspended from the cylinder is used as a measure of the tightness of the container.

Known from U.S. Pat. No. 4 862 732 and DE-A-41 21 867 is a method for testing the tightness of containers closed with caps, in which an overpressure is generated in the container by deformation of the container. The bulging of the container cap is used as a measure of the generated overpressure.

SUMMARY OF THE INVENTION

The object on which the invention is based is the development of the internal pressure test of the type initially referred to in such a way that the containers can be subjected to the internal pressure test at any temporal or spatial intervals.

This object is achieved, according to the invention, in that the internal pressure in the container differing from the ambient pressure is generated by deformation of the container.

For the purpose of producing the negative pressure, the container is first deformed and the container opening is then closed, whereupon the deformation force is removed from the container so that the latter resumes its normal shape, due to its elasticity of form, resulting in the generation of the negative pressure in the container. In this working with negative pressure, it is particularly advantageous that the container opening can be closed simply by setting an elastic strip on the container opening. Due to the negative pressure produced following the removal of the deformation force, the elastic strip is sucked on to the container opening, and thereby closes the latter tightly. In so doing, the elastic strip forms a depression within the container opening. The level of the negative pressure can be easily derived from the magnitude of the depression.

In the case of beverage filling installations, there exists the principle of delivery under accumulation pressure and, in contrast to this, the principle of pressureless delivery. Delivery under accumulation pressure means that the containers accumulate and press against one another on the transporters between the individual stations, e.g. washing station, monitoring station and filling station. This is achieved by the fact that the containers are delivered to a station or to a preceding star wheel more rapidly than they can be handled by the station or indexed by the star wheel. The containers thus accumulate before the station or the star wheel, i.e., the intake worm of the star wheel. By contrast, modern filling installations transport the containers without pressure, i.e., without accumulation pressure, which means that the containers are transported to the individual measuring and processing stations in any temporal sequence and at any mutual interval, where they are tested and processed. In the case of pressureless delivery, therefore, it is not necessary for the containers to be passed through the individual stations in a definite time cycle or pattern. A particular advantage of this invention is that the internal pressure test can be effected in the course of such pressureless delivery. The internal pressure test is effected while the bottles are delivered in a straight line on a transporter, e.g. on a link chain or a conveyor belt. The mechanical structure is therefore extremely simple and only very little space is occupied.

The internal pressure test is effected by generation of negative pressure in the container or the bottle and comprises two essential components, namely, a device for generating a negative pressure in the plastic container relative to the ambient pressure and a measuring device for checking the negative pressure.

The device for generating the negative pressure preferably consists of a compression device with two opposing rubberized rollers, two opposing circulatory belts having a separation which is smaller than the container diameter or two opposing extendable cylinders, so that the containers are deformed by lateral compression upon passing through this compression gap. Simultaneously with the compression of the container, a strip is set on the upwardly facing opening of the container. The strip seals the container opening. When the container leaves the compression device, the deformation recedes and the container assumes its original form due to the elasticity of form of the container walls. Since the container opening is sealed by the imposed strip, the negative pressure is thereby produced in the container. The container to be tested then passes through a relatively long test section, of e.g. 1 to 3 m, accompanied by the sealing strip placed on the container opening. If the container is not tight, e.g. if there is a hole or embrittlement crack, the negative pressure in the container is wholly or partially broken down during this section.

At the end of the predetermined test section, the sealing strip is reseparated from the container by mechanical force, in that it is drawn off upwards, the container being held in place if necessary by a restraint on the rail guard or by belts. In the case of a sufficient path length, it is very easy at this point to effect a determination between tight and non-tight containers, the point of separation of the sealing strip being monitored by means of the measuring device, e.g. a light barrier. In the case of tight containers, the upper sealing strip will continue to bear firmly against the container opening and will only belatedly separate from the container opening due to the action of the mechanical force; in the case of non-tight containers, it rests only loosely and separates at a substantially earlier point in time. This difference can be easily monitored by means of a light barrier. In the case of tight containers, the withdrawal of the sealing strip from the container opening produces a characteristic sound, so that an acoustic discrimination is also possible.

More precise measurements, or a shortening of the test section in order to keep the installation compact, can be achieved by means of more elaborate measuring devices. For example, it would be possible to ascertain, by form recognition by means of CCD cameras or light barriers, whether or to what extent the plastic container remains deformed at the end of the distance.

A further possibility is to fabricate the sealing strip from a relatively thin and elastic material, e.g. latex, so that when it bears on the container opening, the negative pressure causes it to undergo a concave deflection which is proportional to the negative pressure. The extent of this deflection can be determined at the end of the distance by means of appropriate sensors, e.g. ultrasound sensors or displacement measuring devices, by means of light and also, in the case of the strip having a metallized surface, by means of inductive displacement measuring devices. A further, additional, increase in the measuring accuracy is possible through a preferential measurement by means of a second measuring device of the same kind at the start of the sealing strip. By comparison of the measurement values supplied by the two measuring devices, it is possible to detect even smaller leaks such as hairline cracks.

The tightness of the containers can be ascertained in a particularly simple manner in that the containers are sucked on to the sealing strip by the negative pressure produced within them and, suspended from the sealing strip, are transported away over a gap in the transporter. Tight containers are held firmly by suction to the sealing strip due to the negative pressure existing within them so that, suspended from the sealing strip, they are transported without difficulty over the gap. By contrast, the negative pressure in non-tight containers will not be sufficient to enable the containers to be held firmly by suction to the sealing strip. Non-tight containers will therefore separate from the sealing strip within the gap and fall down. They can be collected, for example, in a collecting basket located below the gap in the transporter.

In addition to the substantially simpler structure already mentioned, the advantages of the new method compared with the conventional pressure test lie particularly in the accuracy and the increased reliability. The increased reliability is achieved merely by the fact that, in the case of the method according to the invention, the plastic containers are subjected to a mechanical stress by the compression device, as a result of which fine hairline cracks are opened further and embrittlement points or weak points caused by ageing already result in breakage during the test whereas, in the case of the conventional test methods, the containers are only subjected to a slight overpressure which scarcely affects the walls themselves, so that the mechanical stress occurs only later, when the containers are filled, and breakages do not become apparent until then.

In the case of such a linearly constructed measuring device, the test section can be lengthened almost optionally without difficulty and without great elaborateness so that, if required, there is a very long period of time available for monitoring a pressure drop. By contrast, the lengthening of the test section in a rotary star machine is only possible to a very limited extent and with a very large degree of elaborateness, since each lengthening of the test section by one bottle means a further measuring device.

A further disadvantage of the rotary star machine is that it consists of a very large number of individual measuring devices and consequently, in addition to the amount of measuring equipment required, the risk of failure and the calibration work are substantially increased. It is almost impossible to achieve an exactly uniform calibration of the 16 or 24 measurement points of a rotary machine. This problem is avoided in the case of a linearly constructed measuring device.

An embodiment example of the invention is explained below with reference to the drawing, wherein:

BRIEF DESCRIPTION OF THE DRAWINGS

FIG. 1 shows a side view of the device for the internal pressure test;

FIG. 2 shows a top view of the device for the internal pressure test;

FIG. 3 shows a detail view of the sealing strip bearing on the container opening.

DETAILED DESCRIPTION OF THE PREFERRED EMBODIMENT

Figure 4:
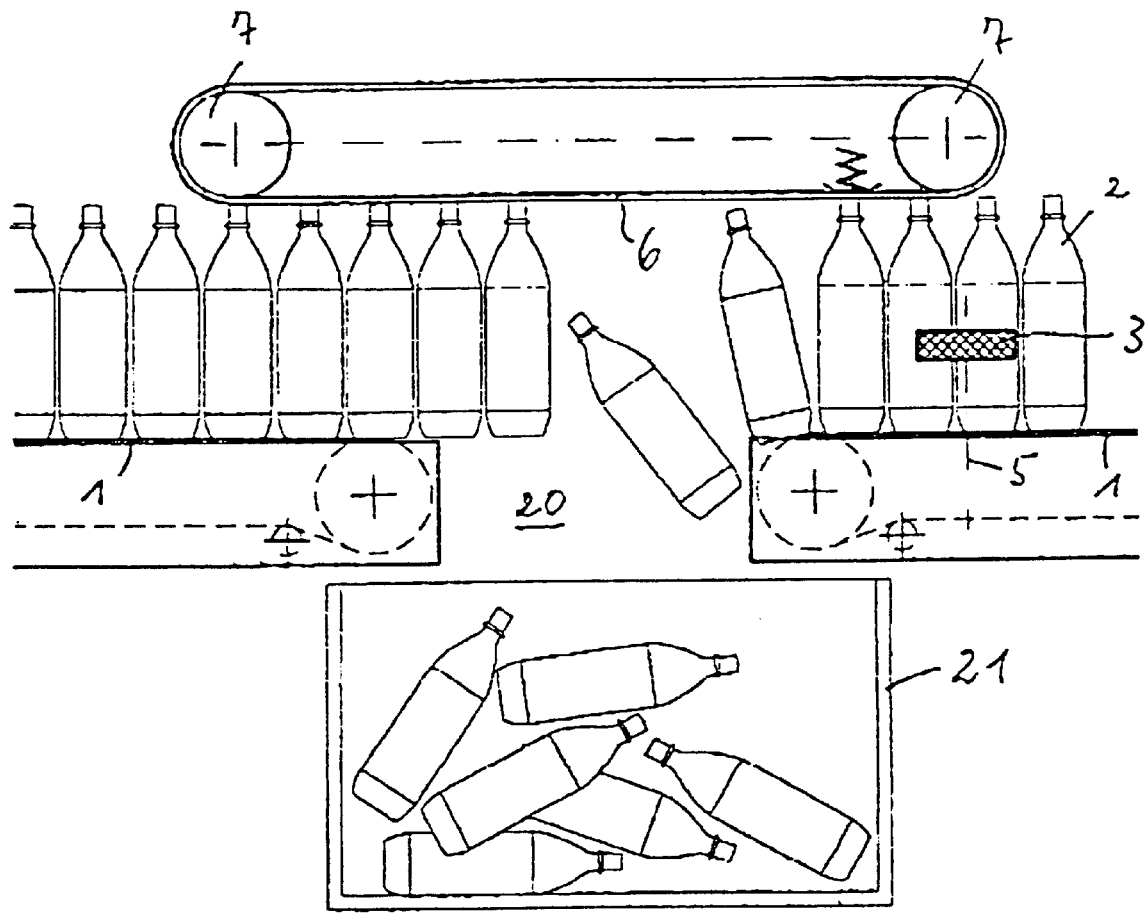
FIG. 4 shows another embodiment example of the device for the internal pressure test.

According to FIGS. 1 and 2, a number of plastic containers 2 are conveyed on a transporter in the form of a rectilinear conveyor belt 1. Two rubber rollers 3, 4 are disposed, so as to be capable of rotation about a vertical axis, at opposing positions adjacent to the conveyor belt 1. The rubber rollers 3, 4 are driven with a surface velocity which is equal to the velocity of the conveyor belt 1. The rubber rollers 3, 4 form between them a compression gap 5 which is dimensioned so that the containers 2 are compressed by about 30% of their diameter. The width of the compression gap 5 and the elasticity of the rubber rollers 3, 4 are selected so that the containers 2 are only deformed but so that the container wall is not buckled or otherwise permanently deformed, so that the containers 2 resume their original form following their passage through the compression gap 5.

A sealing strip 6 is guided by two guide rollers 7 at a distance above the conveyor belt 1 which corresponds to the height of the plastic containers 2. One of the rollers 7 is positioned above the compression gap 5 so that the sealing strip 6 is set on the opening 8 of a container 2 at the instant of its greatest deformation. The other guide roller 7 is disposed at a distance of approximately 3 m from the compression gap 5 in the direction of motion, so that the sealing strip 6 bears on the container openings 8 over a distance of 3 m. The sealing strip 6 is elastic and is self-adapting to the opening and the container height tolerances. The sealing strip 6 is composed, for example, of latex. As mentioned above, each container 2 returns to its original form after passing through the compression gap 5. As a result, there is produced in the container 2 a negative pressure by means of which the sealing strip 6 is sucked in by the container opening 8 and bears firmly against the latter. In so doing, the sealing strip 6 forms a concave depression 9 (FIG. 3).

The plastic containers 2 are transported further in this state to a measuring device 10 which is located before the second guide roller 7. Intact containers 2 maintain the negative pressure, so that the depression 9 is still present when the container 2 reaches the measuring device 10. Non-tight containers, e.g. containers with embrittlement cracks, do not maintain the negative pressure, so that the depression 9 is not formed or disappears rapidly following passage through the compression gap 5.

On reaching the measuring device 10, the containers 2 pass through a trigger light barrier 11 which activates a displacement measuring device 12. The displacement measuring device 12 determines the extent of the depression 9 and sends an analog measurement signal to an evaluating computer 13 which determines, according to a preset limiting value, whether the negative pressure present in the container 2 is still adequate or whether it is a defective container 2. The displacement measuring device is of a known design and is therefore not described in detail here. The sealing strip 6 bearing on the container opening 8 is withdrawn by force by the second guide roller 7 disposed after the measuring device 10, the container 2 being prevented by an additional guide bar 14 from following the sealing strip 6 in its path around the second guide roller 7, so that it has to separate from the sealing strip 6.

In the case of the embodiment example depicted in FIG. 4, the conveyor belt 1 is interrupted within the test section, so that there is a gap 20 within which the containers 2 are not supported by the conveyor belt 1. In respect of the compression device (rubber rollers 3, 4) and the arrangement and drive of the sealing strip 6, this embodiment example corresponds to that of FIGS. 1 to 3. The containers 2 are sucked on to the sealing strip 6 by the negative pressure produced in them following their passage through the compression gap 5 and the application of the sealing strip 6. The flawless containers 2 remain adhering to the sealing strip 6 within the entire test section and, in this state, are transported away over the gap 20 without difficulty. In non-tight containers 2, by contrast, no negative pressure is produced or the negative pressure is of only such a short duration that they do not adhere, or do not adhere sufficiently, to the sealing strip in order to be transported over the gap 20. Rather, non-tight containers 2 fall from the sealing strip 6 within the gap 20 and are collected in a collecting basket 21 located below the gap 20. The tight containers 2 adhering to the sealing strip 6 are replaced on the conveyor belt 1 after the gap 20 and are then separated from the sealing strip 6 by force in the measures described in connection with the example of FIGS. 1 to 3.

I claim:

1. A method for testing deformable containers having a opening for tightness, wherein a negative pressure is generated in the container by first deforming the container by applying a deformation force onto the container, then closing the opening of the container and thereupon removing the deformation force from the container and the internal pressure of the container is then measured.

2. The method according to claim 1, wherein a sealing strip is set on the container opening in order to maintain the negative pressure in the container.

3. The method according to claim 2, wherein the level of the negative pressure is determined from the depression produced in the sealing strip, in the region of the container opening, by the negative pressure.

4. The method according to claim 2, wherein the negative pressure is generated in the container such that a tight container is sucked on to the sealing strip by the negative pressure and is transported without further support, whereas a defective container falls from the sealing strip.

5. A device for the execution of the method according to claim 1, comprising a transporter for the containers, a compression device which comprises a compression gap by means of which the containers transported on the transporter are deformed and at least two guide rollers for guiding an endless sealing strip by at a distance above the transporter, the first guide roller being disposed above the compression gap.

6. The device according to claim 5, wherein a measuring device for determining the negative pressure in the container is disposed before the second guide roller.

7. The device according to claim 6, wherein the measuring device comprises a displacement measuring device which determines the magnitude of a depression in the sealing strip.

8. The device according to claim 5 wherein in the region below the sealing strip, the transporter is interrupted by a gap, so that tight containers, sucked on the sealing strip, are conveyed over the gap, whereas defective containers separate from the sealing strip within the gap, at the latest, and fall into the gap.

* * * * *